United States Patent
Pflueger et al.

(10) Patent No.: US 6,285,100 B1
(45) Date of Patent: *Sep. 4, 2001

(54) ELECTRICAL MACHINE, PREFERABLY A ROTARY CURRENT GENERATOR WITH A RECTIFIER COMPONENT AND WITH UPPER HEAT SINK PROVIDED WITH AXIAL COOLING FINS

(75) Inventors: Gerhard Pflueger, Markgroeningen; Ludwig Bolz, Waiblingen; Uwe Knappenberger, Muehlacker; Thomas Bilsing, Bietigheim-Bissingen, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/367,202
(22) PCT Filed: Jan. 2, 1998
(86) PCT No.: PCT/DE98/00003
 § 371 Date: Aug. 9, 1999
 § 102(e) Date: Aug. 9, 1999
(87) PCT Pub. No.: WO98/36486
 PCT Pub. Date: Aug. 20, 1998

(30) Foreign Application Priority Data

Feb. 12, 1997 (DE) .............................................. 197 05 228

(51) Int. Cl.[7] .......................... H02K 11/00; H02K 11/04; H02K 19/36

(52) U.S. Cl. ........................................... 310/68 D; 310/64
(58) Field of Search .................................. 310/68 D, 64, 310/58, 71, 89; 363/145

(56) References Cited

U.S. PATENT DOCUMENTS

| 4,606,000 | * | 8/1986 | Steele et al. .......................... 363/145 |
| 4,952,829 | * | 8/1990 | Armbruster et al. .............. 310/68 D |
| 5,331,231 | * | 7/1994 | Koplin et al. ....................... 310/68 D |
| 5,473,208 | * | 12/1995 | Stihi ................................... 310/68 D |
| 5,646,838 | * | 7/1997 | Keidar et al. ........................ 363/145 |
| 5,659,212 | * | 8/1997 | DePetris .............................. 310/68 D |

FOREIGN PATENT DOCUMENTS

| 1151857 | * | 5/1969 | (GB) .................................. 310/68 D |
| 58-172961 | * | 5/1969 | (JP) ........................................ 310/89 |

* cited by examiner

Primary Examiner—Karl Tamai
(74) Attorney, Agent, or Firm—Michael J. Striker

(57) ABSTRACT

An electrical machine is proposed, preferably a rotary current generator (10), with a rectifier component (26) at the rear end area of its end shield (11), in which dissipation of waste heat is to be improved. Positive and negative heat sinks (27, 28) with the positive and negative diodes (31, 32), respectively, are screwed to the end shield (12) so as to be sandwiched together with a printed circuit board (30) for the connection between diodes and winding connections (17a) with the inclusion of an insulating plate (29). The upper heat sink (27) has a plurality of cooling air openings (38) arranged next to one another at the inner circumferential area for a cooling air flow generated by the fan of the machine. In order to improve the dissipation of heat, axial cooling fins (39) are formed on at least at some of the cooling air openings (38) of the upper heat sink (27).

16 Claims, 4 Drawing Sheets

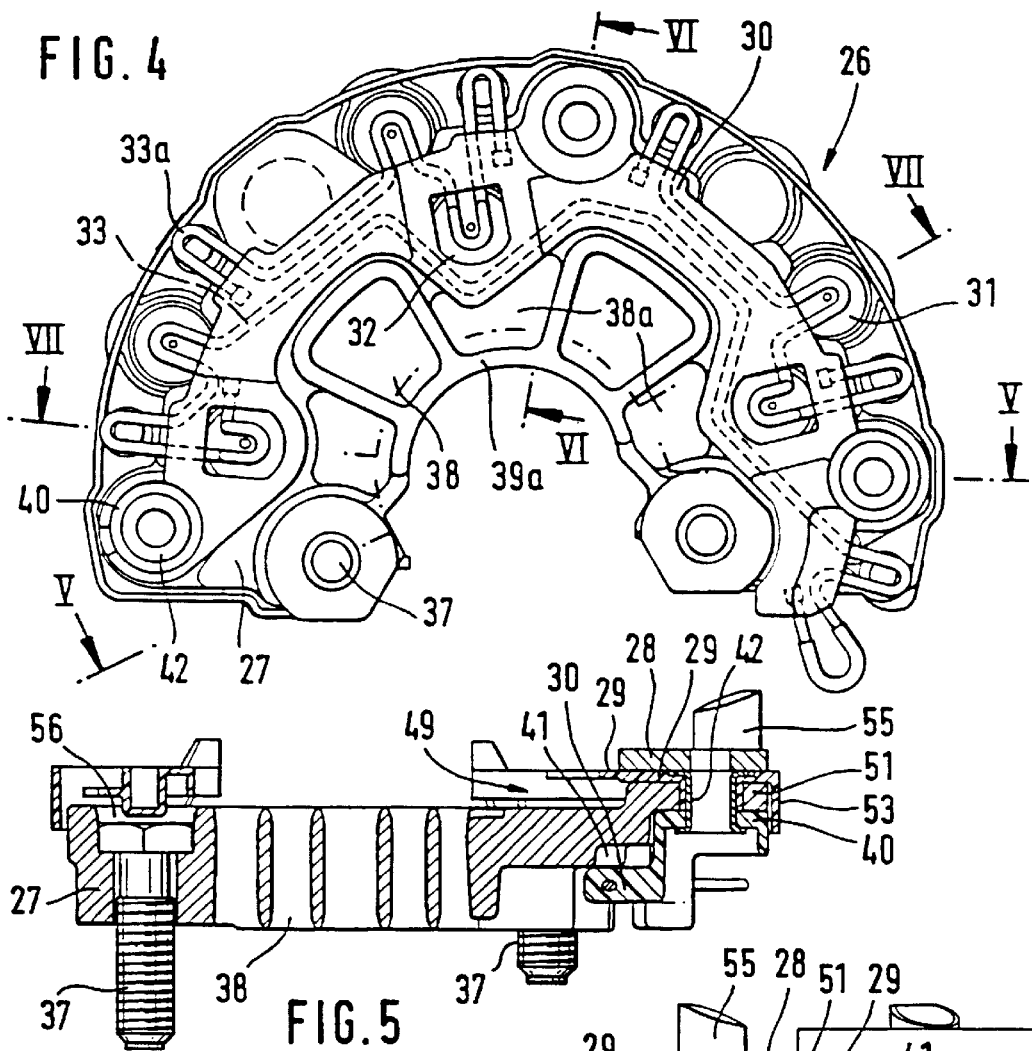
FIG. 4
FIG. 5
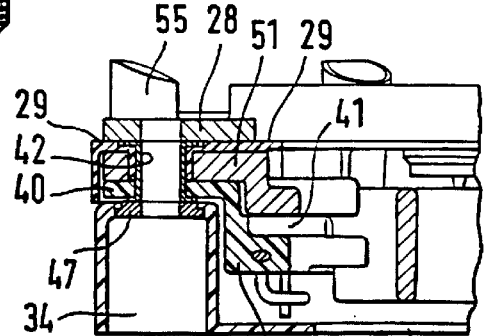
FIG. 6
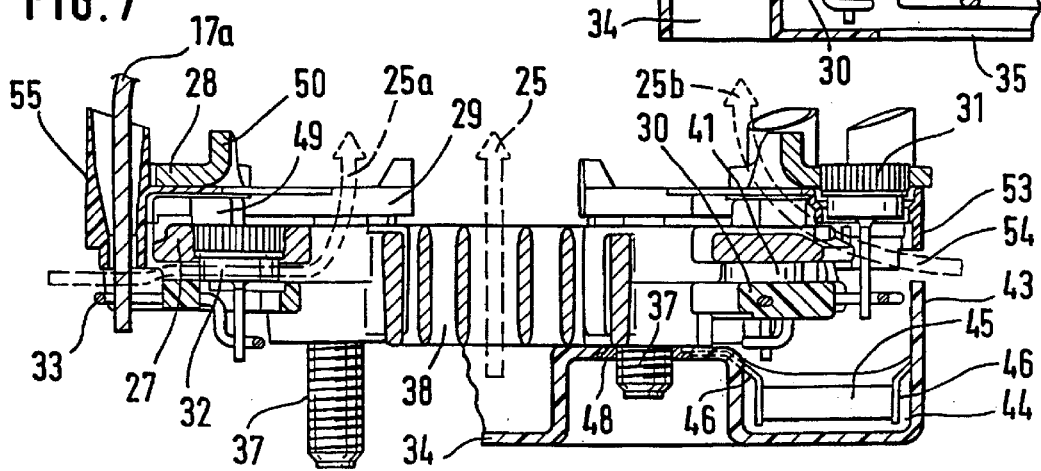
FIG. 7

ELECTRICAL MACHINE, PREFERABLY A ROTARY CURRENT GENERATOR WITH A RECTIFIER COMPONENT AND WITH UPPER HEAT SINK PROVIDED WITH AXIAL COOLING FINS

BACKGROUND OF THE INVENTION

The invention is based on an electrical machine, preferably a rotary current generator or three-phase generator with a rectifier component.

In a known solution of the type mentioned above (U.S. Pat. No. 5,451,823), the positive and negative diodes of a rectifier component are each fastened to a cooling member or heat sink and electrically connected therewith by a connection. The heat sinks are fastened to the end face of an end shield for a rotary current generator so as to be sandwiched with an insulating plate added therebetween. The lower heat sink is attached to the end face of the end shield so as to be electrically and thermally conducting. A printed circuit board having a quantity of conductors embedded in the plastic of the printed circuit board for the connection of a positive diode and a negative diode on one side and having the winding ends of the rotary current winding in the stator of the rotary current generator on the other side is located on the upper heat sink. This rectifier component is held together by rivets and is fastened to the rotary current generator by screws. For purposes of cooling the upper curved heat sink, this heat sink is provided in the area of its inner circumference with a plurality of cooling slits which are arranged next to one another and oriented axially relative to the axis of the electrical machine; an axial cooling air flow is sucked in at the front side through the cooling slits from the outside toward a fan which is fastened to the rotor of the generator. The cooling air is blown radially outward through slits at the outer circumference of the end shield by fans in a known manner.

A disadvantage in this known solution is that the openings provided in the upper heat sink of the rectifier component for the flow of cooling air have relatively small cooling surfaces for dissipation of heat, so that a relatively thick upper heat sink is needed in order to achieve an adequate cooling surface at the cooling air openings. As a result of the accumulation of material required in this case, the upper heat sink used in this case is correspondingly expensive and heavy. Further, in order to achieve a large cooling surface for the cooling air flow, the openings in the heat sink are constructed as narrow, radially extending slits which again present a relatively high air resistance for the cooling air flow. The air volume sucked in through these slits and therefore also the cooling effect are accordingly small. The use of more powerful fans leads to higher costs and increased flow noise.

It is the aim of the present solution to improve the cooling performance by rearranging the rectifier component.

SUMMARY OF THE INVENTION

The electrical machine according to the invention has the advantage that the cooling air flow covers a considerably larger cooling surface of the heat sink without increasing flow resistance in that axially extending cooling fins are formed on at the openings of the upper heat sink. This results in the additional advantage that the cooling air openings are no longer constructed as slits, but rather can be substantially larger so that the air throughput is increased independent from the fan and the dissipation of heat from the rectifier component is accordingly improved and flow noise is reduced. Moreover, the upper heat sink can be constructed so as to be thinner, which leads to considerable savings in material.

It is particularly advantageous when there is a distance between the upper heat sink and the printed circuit board, which distance forms an air gap at the front side of the heat sink for a radial flow of cooling air from the outer circumference of the upper heat sink to some of its cooling air openings at the inner circumferential area. It is also advantageous when, instead of this, there is a space between the upper heat sink and the insulating plate arranged on the lower heat sink, which space forms an air gap at the rear of the upper heat sink for another radial flow of cooling air from the outer circumference of the upper heat sink to at least the inner circumferential area of the lower heat sink. Finally, an optimum cooling action at the upper heat sink is achieved in that the upper heat sink is exposed on both sides to a cooling air flow in that a first radial cooling air flow is conducted between the upper heat sink and the printed circuit board situated in front of the latter and another radial cooling air flow is conducted between the upper heat sink and the insulating plate located behind the latter from the outside radially inward to the fan.

BRIEF DESCRIPTION OF THE DRAWINGS

An embodiment example of the invention is shown in the drawing and explained more fully in the following description.

FIG. 4 shows the rectifier component in a front view; and

FIGS. 5 to 7 show sectional views of the rectifier component from FIG. 4.

DESCRIPTION OF THE PREFERRED EXAMPLE

Figure 1:
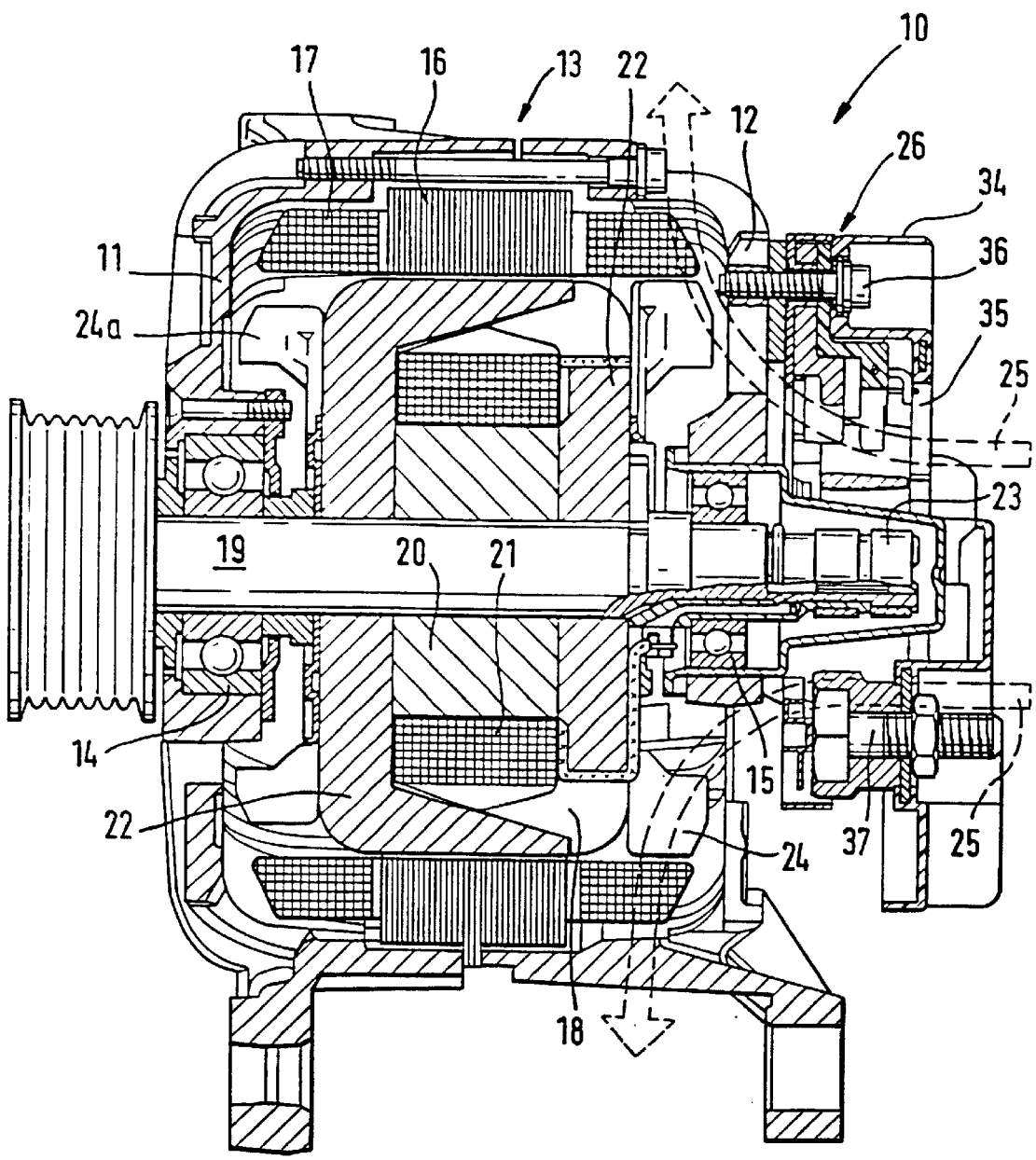
FIG. 1 shows a rotary current generator with a rectifier component at the rear end shield in longitudinal section.
Figure 2:
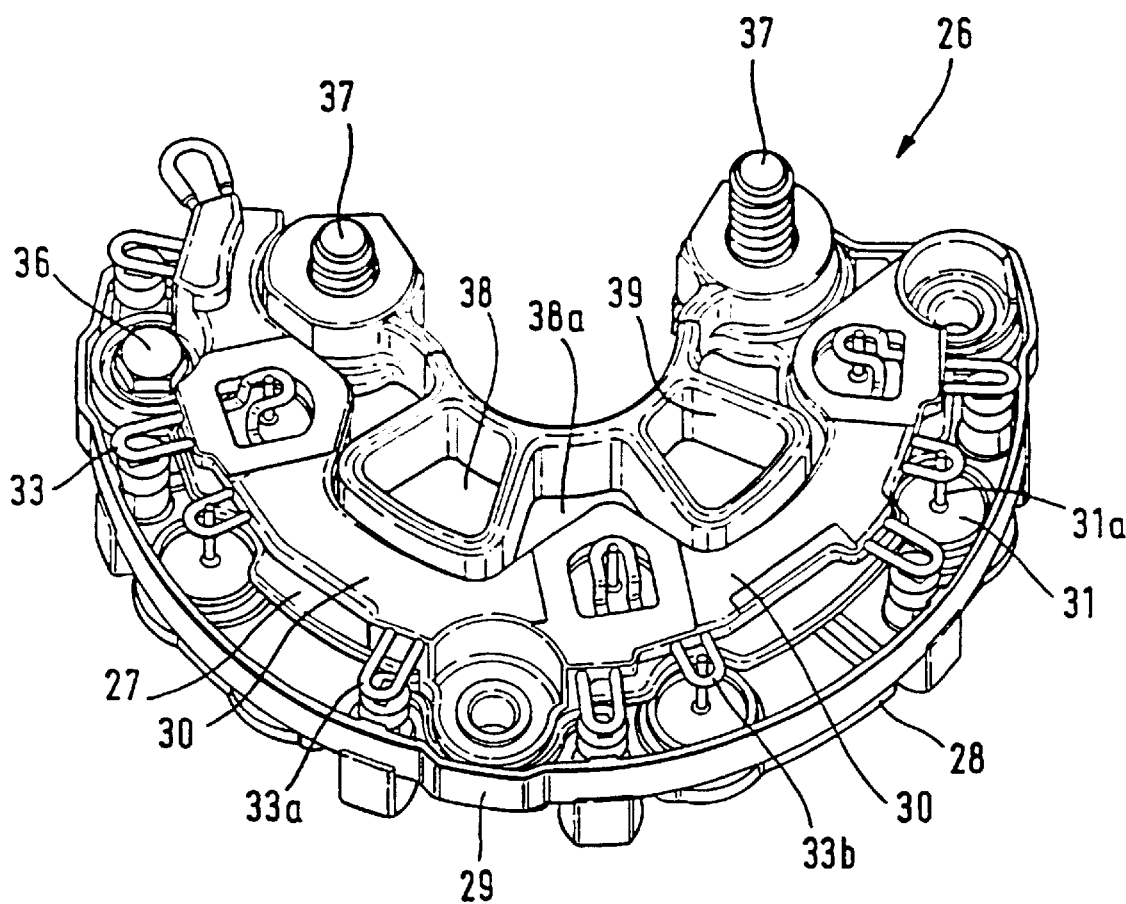
FIG. 2 shows the rectifier component according to the invention in a three-dimensional view.
Figure 3:
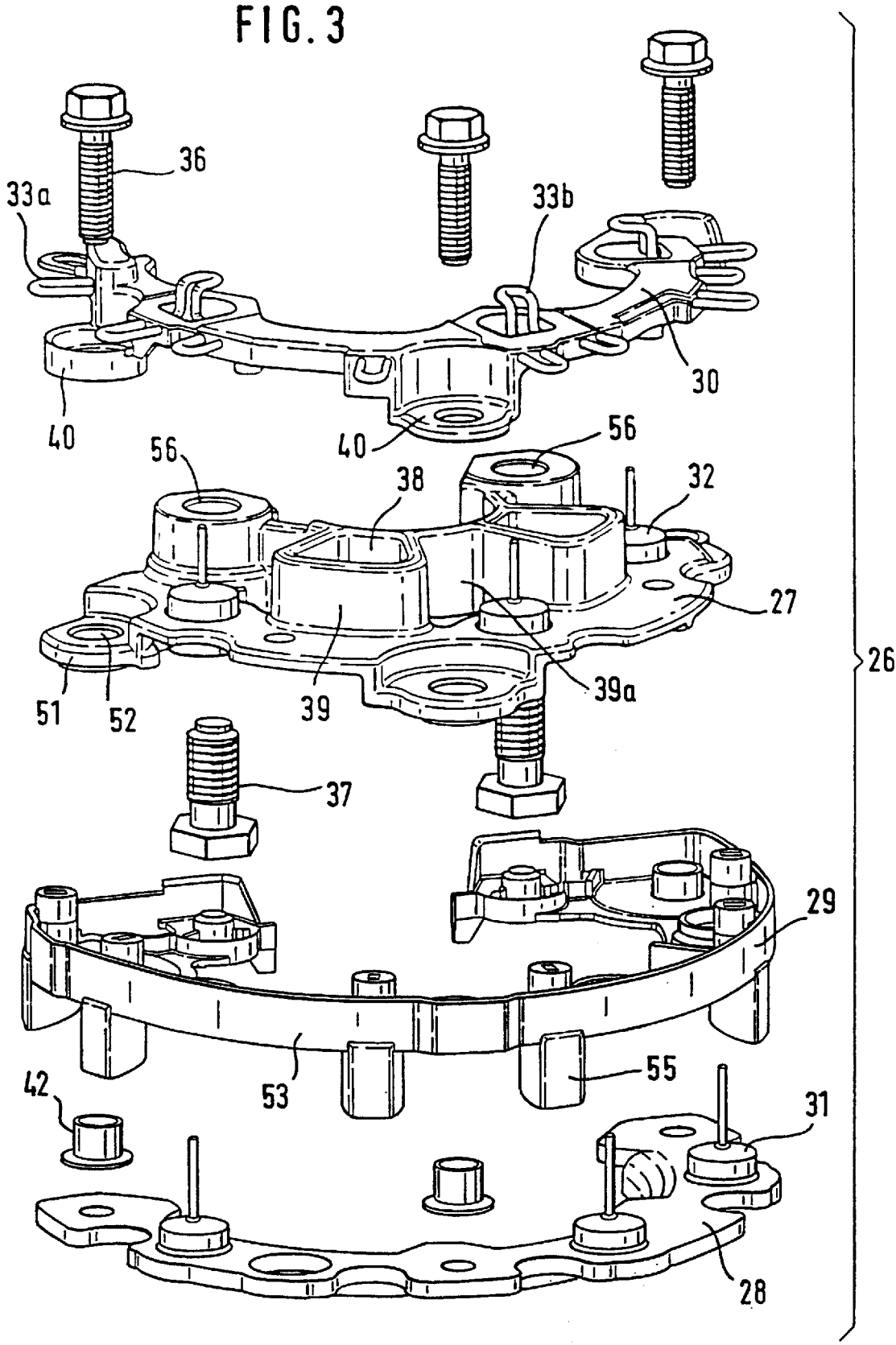
FIG. 3 shows the individual subassemblies of the rectifier component from FIG. 2 before assembly in a three-dimensional view.

In FIG. 1, a rotary current generator for motor vehicles is designated by 10. It has a diecast housing 13 formed of two shell halves 11, 12; the front shell half 11 is constructed as an end shield for a drive bearing 14 and the rear shell half 12 is formed as an end shield for a weaker ball bearing 15. The two shell halves of the housing 13 fix a stack of stator laminations 16 which, in a known manner, holds a three-phase stator winding 17 for generating the rotary current. A claw-pole rotor 18 is arranged in the stator bore of the stator laminations stack and is mounted by its rotor shaft 19 in the shell halves 11, 12 of the housing 13. The rotor shaft 19 carries a magnetically conducting toroidal core 20 in its central area, an exciting winding 21 being arranged thereon. At both sides of the latter, a claw-pole plate 22 is fastened to the rotor shaft 19, its claw-pole fingers engaging one inside the other at a distance from one another to form an alternating field. A slip ring arrangement 23 is fastened to the rear end of the rotor shaft 19 to supply current to the exciting winding 21, each slip ring being electrically connected with one end of the exciting winding 21. The slip rings cooperate in a known manner with a carbon brush arrangement, not shown, in which a regulator is integrated for regulating the current in the exciting winding as demanded by the electrical supply system of the motor vehicle. A fan 24 is fastened to the front of the claw-pole plate 22 on the inner side of the rear shell half 11; this fan 24 sucks in a cooling air flow 25 axially through corresponding slits at the front side of the shell half 11 and blows it radially past the rear end windings of the stator winding 17 radially outward through external slits in the rear shell half. A second fan 24a is located at the front side of the front claw-pole plate 22 in the interior of the front shell half 11 in order to suck in a cooling air flow in this location axially through slits in the housing half 11 and blow it past the front end windings of the stator winding 17 radially outward through external housing slits. A rectifier component 26 which is connected on the input side in a known manner with the winding outputs of the stator winding 17 for rectification of the rotary current induced in the latter is located at the outer front side of the rear shell half 12 in the cooling air flow 25 which is sucked in axially by the rear fan 24. The DC voltage needed for supplying the motor vehicle supply system is taken off at the output of the rectifier component 26 in a known manner.

Details of the rectifier component 26 are shown in FIGS. 2 to 7. The rectifier component 26 is formed of a plate-shaped positive heat sink 27 and a negative heat sink 28 made from thermally conducting metal, preferably aluminum. The two heat sinks 27, 28 which are located one above the other are electrically insulated from one another by an insulating plate 29 and are sandwiched together with a printed circuit board 30 arranged on the upper heat sink 27 at the front area of the end shield of the machine forming the rear shell half 12. A plurality of negative diodes 31 are pressed into preferably corrugated bore holes by their anode terminal in the negative heat sink 27, wherein the negative heat sink 28 is to be fastened flat against the front side of the rear shell half 12 to carry off waste heat from the negative diode 31. In the same way, a plurality of positive diodes 32 are pressed into the positive heat sink 27 on the cathode side. The series connection of a negative diode 31 with a positive diode 32 and their connection with an end of the stator winding 17 is carried out by means of conductor wires 33 which, with the exception of their connection ends 33a, are embedded in plastic in the printed circuit board 30. The rectifier component 26 is covered on the outside by a protective cap 34 of plastic which is provided with openings 35 arranged on the front in an appropriate manner to allow the cooling air flow 25 to enter. The printed circuit board 30, positive heat sink 27, insulating plate 29 and negative heat sink 28 are screwed to the front side of the rear shell half 12 one above the other by fastening screws 28. The protective cap 34 is further fastened to the positive heat sink 27 by connection screws 37.

The waste heat of the rectifier component 26 is carried off from the upper positive heat sink 27 by means of a heat-conducting support of the lower negative heat sink 28 at the end shield of the rear housing half 12 and by means of the cooling air flow 25 of the fan 24 in that this upper positive heat sink has a plurality of cooling air openings 38 arranged next to one another at the inner circumferential area to allow the cooling air flow 25 to pass through axially. To achieve the best possible dissipation of waste heat from the positive heat sink 27 in the cooling air flow 25, axially oriented cooling fins 39 are formed on at the cooling air openings 38. These cooling fins greatly increase the surface of the positive heat sink 27 exposed to the cooling air flow 25. Accordingly, the cooling air openings 38 can also be enlarged and, consequently, the proportion the cooling air flow 25 flowing through these cooling air openings 38 can also be increased. Compared with known constructions, the number of cooling air openings and the air flow noise can accordingly be reduced.

To further improve the heat dissipation at the positive heat sink 27, a space is provided between this upper heat sink and the printed circuit board 30 through appropriately shaped feet 40 of the printed circuit board 30 which are constructed as spacers; this space forms an air gap 41 for a radial component 25a of the cooling air flow from the outer circumference of the upper heat sink 27 to a plurality of cooling air openings 38a at the inner circumferential area; the cooling air openings 38a have no cooling fins in this area. For the cooling air of the cooling air flow 25 which flows in axially and for the component of the cooling air flow 25a flowing radially, the flow resistance can be kept small in that circumferentially extending cooling fins 39 formed on at the cooling air openings 38 alternate with axially extending cooling fins 39a formed on at the cooling air openings 38a disposed therebetween only at the inner circumference of the heat sink 27, so that the radial cooling air component 25a can arrive without hindrance at the fan 24 through these cooling air openings 38a. The feet 40 formed on at the printed circuit board 30 are provided with bore holes in which rivet sleeves 42 are inserted, the printed circuit board 30 with the upper positive heat sink 27 and the insulating plate 29 being preassembled to form a unit by means of these rivet sleeves 42; the feet 40 which are formed from the insulating material of the printed circuit board 30 serve as spacers for the space between the upper positive heat sink 27 and the printed circuit board 30. The connection ends 33a of the conductor wires 33 in the printed circuit board 30 for the connection of the stator winding ends 17a indicated in FIG. 7 are oriented radially outward away from the outer edge of the printed circuit board 30. The connection ends 33b of the conductor wires 33 are likewise oriented radially outward away from the outer edge of the printed circuit board 30 for connecting the head wires 31a of the negative diode 31. The protective cap 34 is covered by a collar 43 formed on externally in order to protect these connections as is shown in FIG. 7. An anti-interference capacitor 45 of the machine is fitted in a shaped out portion 44 of the protective cap 34; this anti-interference capacitor 45 is electrically connected by contact plate 47 (FIG. 6) and a fastening screw 36 to the end shield of the rear shell half 12 as ground via connection conductors 46 which are embedded in the insulating material of the protective cap 30 and, on the other side, communicates with the connection screw 37 for the positive terminal of the generator via a contact washer 48 anchored in the protective cap 34.

The dissipation of waste heat from the upper positive heat sink 27 is further improved in that a space is formed between the upper positive heat sink 27 and the insulating plate 29 arranged on the lower negative heat sink 28, which space forms an additional air gap 49 for another cooling air flow component 25b flowing radially from the outside to the inside (FIG. 7). This air gap 49 extends from the outer circumference of the upper positive heat sink 27 to the inner circumferential area of the lower negative heat sink 28, so that a cooling air flow component 25b flows from this area past an inwardly directed annular portion 50 at the inner circumference of the lower negative heat sink 28 in order to reach the fan 24. In order to produce this air gap 49, feet serving as spacers 51 are constructed at the outer circumference of the positive heat sink 27 in the area of the fastening screws 36. These spacers 51 lie below the feet 40 at the printed circuit board 30. The fastening bore holes 52 in these spacers 51 are dimensioned large enough that a collar-shaped shoulder engages at the insulating plate 29 and the electric insulation of the positive heat sink 27 relative to the rivet sleeve 42 is ensured. Another collar 53 which is directed toward the upper positive heat sink 27 at a radial distance is formed on at the outer circumference of the insulating plate 29. Together with the collar 43 of the protective cap 34 located at the same circumference, collar 53 at the insulating plate 29 between the positive and negative heat sinks 27, 28 forms an axially defined annular gap 54 (FIG. 7) for the entry of the two partial cooling air flows 25a and 25b which flow from the outside to the inside blowing over the upper positive heat sink 27 at both sides before reaching the fan 24 along with the axial cooling air flow 25.

In order to improve the feed of the stator winding ends 17a to the connection ends 33a of the conductor wires 33 in the printed circuit board 30, appropriately positioned axially oriented receiving and guiding sleeves 55 are formed on at the insulating plate 29 in the outer circumferential area.

For the various vehicle-specific connection possibilities of the supply system, the upper positive heat sink 27 is provided with two connection holes 56 which are located opposite one another for receiving two positive connection screws 37 (FIG. 3) such that the latter are fixed with respect to rotation relative thereto.

The invention is not limited to the embodiment example described and shown herein because the arrangement of the cooling air openings in the upper heat sink for dissipation of heat should be adapted to the cooling air flow and to the given conditions, like the longitudinal fins formed thereon for increasing the surfaces for heat dissipation by the cooling air. Further, depending on spatial conditions and the extent of waste heat to be dissipated by the upper heat sink, a radial flow is required more or less, so that one of the two air gaps 41 and 49 between the upper heat sink and shell half or between the upper heat sink and insulating plate or even both air gaps can possibly be omitted. However, since these radial cooling air flows 25a and 25b flow directly over the positive and negative diodes 31, 32 in which the waste heat to be carried off originates, the air gaps 41 and 49 provided for this purpose are particularly effective. The heat conducting paths in the heat sinks leading up to the cooling air are so short that even high-power (up to 150 A) diodes can be used. Direct thermal coupling of the negative heat sink 28 to the rear end shied and its construction design with direct cooling air at the negative diode 31 in the rear air gap 49 also makes it possible to use high-power (up to 150 A) diodes. A greater degree of standardization of the rectifier component can be realized in this way.

Sufficient protection with respect to insulating and corrosion is ensured by the distance between the parts conducting positive and negative potential. In addition, an accumulation or deposit of corrosive products is prevented by the additional radial cooling air flow component 25a, 25b.

What is claimed is:

1. Rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from an upper heat sink via a heat-conducting contact of a lower heat sink at an end shield on the one hand and, on the other hand, by at least one cooling air flow of a fan of the machine in that this upper heat sink is provided with a plurality of cooling air openings arranged next to one another at the inner circumference to allow the cooling air flow to pass through axially, axial cooling fins (39) are formed at the upper heat sink (27) at least at some of the cooling air openings (38) of the upper heat sink (27), there is a distance between the upper heat sink (27) and the circuit board (30), which distance forms an air gap (41) for a radial cooling air flow (25a) from the outer circumference of the upper heat sink (27) to some of its cooling air openings (38a) at the inner circumferential area, and circumferentially extending cooling fins (39) formed at the plurality of cooling air openings (38) alternate with cooling fins (39a) formed at other cooling air openings (38a) only at the inner circumference of the heat sink (27), so that the radial cooling air flow (25a) can arrive without hindrance at the fan (24) through the other cooling air openings (38a).

2. Rectifier component according to claim 1, characterized in that the space between the upper heat sink (27) and the circuit board (30) is formed by spacers (40) which are supported on the upper heat sink (27) and are formed on at insulating material of the printed circuit board (30).

3. Rectifier component according to claim 1, characterized in that there is a space between the upper heat sink (27) and the insulating plate (29) arranged on the lower heat sink (28), which space forms an air gap (49) for another radial cooling air flow (25b) from the outer circumference of the upper heat sink (27) to at least the inner circumferential area of the lower heat sink (28).

4. Rectifier component according to claim 3, characterized in that the upper heat sink (27) is exposed on both sides to a cooling air flow (25a, 25b) in that a first radial cooling air flow (25a) passes between the upper heat sink (27) and the printed circuit board (30) situated in front of the latter and another radial cooling air flow (25b) passes between the upper heat sink and the insulating plate (29) located behind the latter from the outside radially inward to the fan (24).

5. Rectifier component according to claim 1, characterized in that axially oriented receiving and guiding sleeves (55) for stator winding ends (17a) are formed in an outer circumferential area of an insulating plate (29).

6. Rectifier component according to claim 1, characterized in that the upper heat sink (27) carries the positive diodes (32) and is provided with two connection holes (56) which are located opposite one another for receiving two positive connection screws (37) such that the latter are fixed with respect to rotation relative thereto.

7. Electrical machine, preferably a rotary current generator, with a housing, a rotor which is mounted in the housing so as to be rotatable with at least one fan arranged in the housing, with a rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from the upper heat sink via a heat-conducting contact of a lower heat sink at the end shield on the one hand and, on the other hand, by at least one sucked in cooling air flow of a fan in that an upper heat sink is provided in an area of its inner circumference with a plurality of cooling air openings arranged next to one another to allow the cooling air flow to pass through axially, the circuit board (30) is covered by a protective cap (34) which is provided with openings (35) to allow the cooling air flow (25) to enter, said protective cap (34) includes an outer collar (43) covering radially oriented connections (33a, 33b) of the circuit board (30) for the negative diode (31) and for winding ends (17a) of the machine, axial cooling fins (39) are formed at the upper heat sink (27) at some of the cooling air openings (38) of the upper heat sink (27), characterized in that the protective cap (34) is provided with a shaped out portion (44) in which is inserted an anti-interference capacitor (45) of the machine which is to be electrically connected with the end shield of the machine via connection conductors (46) which are integrated in the protective cap (34) on the one side and, on the other side, communicates with a main connection (positive terminal (37) of the rectifier component (26).

8. Rectifier component according to claim 7, characterized in that spacers (51) directed toward the insulating plate (29) are formed on the upper heat sink (27) to form an air gap (49).

9. Rectifier component according to claim 8, characterized in that a collar (53) which is directed toward the upper heat sink (27) is formed on at the outer circumference of the insulating plate (29).

10. Rectifier component according to claim 9, characterized in that an annular gap (54) for the entry of the cooling air flow component (25a, 25b) is formed between the collar (43) formed onto an outside of the protective cap (34) and the collar (53) formed onto an outside of the insulating plate (29).

11. Electrical machine, preferably a rotary current generator, with a housing, a rotor which is mounted in the housing so as to be rotatable with at least one fan arranged in the housing, with a rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from an upper heat sink via a heat-conducting contact of a lower heat sink at the end shield on the one hand and, on the other hand, by at least one sucked in cooling air flow of a fan in that the upper heat sink is provided in an area of its inner circumference with a plurality of cooling air openings arranged next to one another to allow the cooling air flow to pass through axially, characterized in that axial cooling fins (39) are formed at the upper heat sink (27) at some of the plurality of cooling air openings (38) of the upper heat sink (27), there is a distance between the upper heat sink (27) and the circuit board (30), which distance forms an air gap (41) for a radial cooling air flow (25a) from the outer circumference of the upper heat sink (27) to some of its cooling air openings (38a) at the inner circumferential area, circumferentially extending cooling fins (39) formed at the plurality of cooling air openings (38) alternate with axial cooling fins (39a) formed at other air openings (38a) only at the inner circumference of the heat sink (27), so that the radial cooling air flow (25a) can arrive without hindrance at the fan (24) through the other cooling air openings (38a).

12. Electrical machine, preferably a rotary current generator, with a housing, a rotor which is mounted in the housing so as to be rotatable with at least one fan arranged in the housing, with a rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from an upper heat sink via a heat-conducting contact of a lower heat sink at the end shield on the one hand and, on the other hand, by at least one sucked in cooling air flow of a fan in that the upper heat sink is provided in an area of its inner circumference with a plurality of cooling air openings arranged next to one another to allow the cooling air flow to pass through axially, axial cooling fins (39) are formed at the heat sink (27) at least some of the cooling air openings (38) of the upper heat sink (27), rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from an upper heat sink via a heat-conducting contact of a lower heat sink at an end shield on the one hand and, on the other hand, by at least one cooling air flow of a fan of the machine in that this upper heat sink is provided with a plurality of cooling air openings arranged next to one another at the inner circumference to allow the cooling air flow to pass through axially, axial cooling fins (39) are formed at the upper heat sink (27) at least at some of the cooling air openings (38) of the upper heat sink (27), there is a distance betwen the upper heat sink (27) and the circuit board (30), which distance forms an air gap (41) for a radial cooling air flow (25a) from the outer circumference of the upper heat sink (27) to some of its cooling air openings (38a) at the inner circumferential area, and circumferentially extending cooling fins (39) formed at the plurality of cooling air openings (38) alternate with cooling fins (39a) formed at other cooling air openings (38a) only at the inner circumference of the heat sink (27), so that the radial cooling air flow (25a) can arrive without hindrance at the fan (24) through the other cooling air openings (38a), the circuit board (30) is covered by a protective cap (34) which is provided with openings (35) to allow the cooling air flow (25) to enter and covers radially oriented connections (33a, 33b) of the circuit board (30) for the negative diode (31) and for winding ends (17a) of the machine with a collar (43), and the protective cap (34) is provided with a shaped out portion (44) in which is inserted an anti-interference capacitor (45) of the machine which is to be electrically connected with the end shield of the machine via connection conductors (46) which are integrated in the protective cap (34) on the one side and, on the other side, communicates with a main connection (positive terminal 37) of the rectifier component (26).

13. Electrical machine, preferably a rotary current generator, with a housing, a rotor which is mounted in the housing so as to be rotatable with at least one fan arranged in the housing, with a rectifier component whose positive and negative diodes are arranged at a positive and negative heat sink, respectively, the positive heat sink and negative heat sink being electrically insulated from one another by an insulating plate and fastened to a front area of an end shield of the machine so as to be sandwiched together with a circuit board for diode connections, wherein waste heat of the rectifier component is to be carried off from an upper heat sink via a heat-conducting contact of a lower heat sink at the end shield on the one hand and, on the other hand, by at least one sucked in cooling air flow of a fan in that the upper heat sink is provided in an area of its inner circumference with a plurality of cooling air openings arranged next to one another to allow the cooling air flow to pass through axially, in that axial cooling fins (39) are formed at the heat sink (27) at least some of the cooling air openings (38) of the upper heat sink (27), there is a distance between the upper heat sink (27) and the circuit board (30), which distance forms an air gap (41) for a radial cooling air flow (25*a*) from the outer circumference of the upper heat sink (27) to some of its cooling air openings (38*a*) at the inner circumferential area, and circumferentially extending cooling fins (39) formed at the plurality of cooling air openings (38) alternate with axial cooling fins (39*a*) formed at other cooling air openings (38*a*) only at the inner circumference of the heat sink (27), so that the radial cooling air flow (25*a*) can arrive without hindrance at the fan (24) through the other cooling air openings (38*a*).

14. Electrical machine according to claim 13, wherein spacers (51) directed toward the insulating plate (29) are formed on the upper heat sink (27) to form an air gap (49).

15. Electrical machine according to claim 14, wherein a collar (53) which is directed toward the upper heat sink (27) is formed on at the outer circumference of the insulating plate (29).

16. Electrical machine according to claim 15, wherein an annular gap (54) for the entry of the cooling air flow component (25*a*, 25*b*) is formed between the collar (43) formed onto an outside of the protective cap (34) and the collar (53) formed onto an outside of the insulating plate (29).

* * * * *